United States Patent Office

3,003,920
Patented Oct. 10, 1961

3,003,920
CHEWING GUM PREPARATION
William E. Dominick, 621 Judge Ave., Waukegan, Ill.
No Drawing. Filed Aug. 2, 1956, Ser. No. 601,657
8 Claims. (Cl. 167—93)

This invention relates to new and improved compositions for reducing the concentration of endogenously produced compositions, and more particularly to novel innocuous ion-exchange-containing compositions capable of removing objectionable endogenously produced products.

It is an object of the invention to provide an innocuous ion-exchange-containing composition capable of adsorbing endogenous products in fluids produced within the oral cavity.

It is a still further object of the invention to provide a composition suitable for adsorbing or inhibiting the production of odoriferous decomposition products.

Other objects of the invention will be apparent from the detailed description and claims to follow.

It has been found that the foregoing and other objects of the present invention are achieved by incorporating innocuous ion-exchange resins in a carrier suitable for use in contact with oral cavity surfaces where it removes odoriferous products. The ion-exchange resins which are suitable for use in the present invention are those which are tasteless and non-toxic and are compatible with the surface tissues, which preferably have a high rate of adsorption and are capable of adsorbing very substantial amounts of undesirable products and organisms. One group of ion-exchange resins which meets the above requirements are the substantially water-insoluble anion-exchange resins. The basic anion-exchange resins which contain quaternary ammonium groups, such as the chloromethylated styrene-maleic acid polymer aminated with trimethylamine and thereafter converted to the quaternary ammonium anion-exchange resin as in U.S. Patent No. 2,591,573, will when used in small amounts adsorb endogenously produced products which resemble anions, such as the bacteria carrying negative charges in solution. A basic anion-exchange resin, such as "Amberlite IRA-400," Rohm & Haas Co., has the foregoing properties. Also useful in the present invention are the anion-exchange resins of the type disclosed in U.S. Patent No. 2,570,822, such as the water-insoluble resins formed by the reaction of polyalkylene polyamine with formaldehyde, an alkylene polyhalide, and an α:β-unsaturated aldehyde or ketone, with a specific example thereof being as shown in Example IV of the above patent.

Where a strongly basic ion-exchange resin when used alone would tend to produce an excessively basic condition, the basic ion-exchange resin is desirably mixed with an ion-exchange material which will remove free base from solution, such as the ion-exchange resins having carboxylic groups as the active polar groups. The latter ion-exchange resins in their acidic form will remove free base from solution but are ineffective in removing cations from salt solutions. These carboxylic type exchangers can also be utilized in a mixed sodium and hydrogen form so that the solution or body surface in contact therewith is maintained at a pH of about 7. Carboxylic type ion-exchange resins which are useful in the present invention can be made according to U.S. Patents 2,340,110, 2,340,111, and 2,597,437. The resin "Amberlite IRC-50," sold by Rohm & Haas Co., is a product of the above type having weakly-acidic carboxylic groups. Other similar carboxylic products are sold under the trade names of "Amberlite XE-64" and "Duolite CS-101," sold by Rohm & Haas Co. and Chemical Process Co., respectively. Also, it should be understood that the cation-exchange resins, such as the above carboxylic-type exchangers, in addition to removing excess free base, will also remove from solution and from the surfaces with which it comes in contact, undesirable matter which carry positive charges in solution and which, therefore, have characteristics similar to cations.

Another group of ion-exchange resins which has been found very useful in the present invention are the weakly basic anion-exchange resins. Several of the latter resins have been used for the treatment of peptic and duodenal ulcers. An example of a weakly basic anion-exchange resin which has been found particularly useful in the present invention is the polymeric condensation products of phenol, formaldehyde, and an alkalene polyamine. Certain of these resins and a process for their preparation are described in U.S. Patent No. 2,402,384. The condensation product of dihydroxyphenyl dimethylmethane, formaldehyde, and a polyethylene polyamine, such as tetraethylene-pentamine, in basic form is prepared as disclosed in Example IV of U.S. Patent No. 2,402,384. The latter product is sold commercially as "Amberlite XE–59." Another weakly basic anion-exchange resin useful in the present invention is the chloromethylated proliferous co-polymer of styrene and butadiene aminated by means of diethylene triamine in accordance with Example IV of U.S. Patent No. 2,597,439. Other anion-exchange resins of the weakly basic type are well known and are marketed in large volume for deionization of aqueous fluids. Such resins as are being currently used are described in U.S. Patents 2,356,151 and 2,591,574. One of such products is "Amberlite IR-4B," sold by Rohm & Haas Co. Other products of this class are "Iionac-300," American Cyanamid Co., and "Duolite A-41," a basic ion-exchange resin comprising an aliphatic matrix containing weakly basic tertiary amine groups and highly basic quaternary ammonium groups, sold by The Chemical Process Co. Resins of this general type are manufactured by other concerns under different trade names. If desired, mixtures of the various ion-exchange resins may be employed.

When ion-exchange resins of the type disclosed in the present invention is incorporated in a paraffin wax base, or in a commercially available chewing gum product, preferably in an amount between about 5% and 40% by weight, the surfaces in contact therewith are cleansed appreciably because of the high adsorptive capacity which the said compositions have for endogenously produced products.

When 20% by weight of the anion-exchange resin "Amberlite XE–58" is incorporated in the "chewing gum B" and the first 5 cc. sample of saliva collected, the pH of the saliva sample after standing for 10 hours at room temperature has a pH value above 5.0. When normal saliva collected by chewing a gum having 15% by weight "Amberlite XE–58" in the "chewing gum A" is allowed to stand at room temperature after adding thereto excess glucose, there are no objectionable odors evident even after holding the saliva at room temperature for periods of over one week. In contrast with the latter, when the saliva collected by chewing ordinary paraffin wax has added thereto excess glucose and is held at room temperature, there develops a very disagreeable odor within one week and the odor becomes more objectionable on standing. It thus is evident that the compositions of the present invention are able to inhibit high concentrations of objectionable endogenously produced odoriferous products on surfaces with which it is in contact.

The folowing specific examples are set forth only for the purpose of further illustrating the present invention and should not be construed to restrict the invention to the embodiments shown nor to the specific ingredients and proportions used.

A useful composition for accomplishing the objects of the present invention is a chewing gum composition which has incorporated therein an ion-exchange resin of the present invention. Because of the prolonged and intimate contact which the new gum composition has with the saliva and the surfaces of the oral cavity and because of the very high adsorptive capacity which the composition of the present invention has for endogenous products present, the surfaces are cleansed. An ordinary stick of chewing gum weighing about 3 gr. will desirably have incorporated therein between about 5 grains and 15 grains of anion-exchange resin of the present invention. The following chewing gum composition is given only by way of example and any suitable chewing gum base could be used in the present invention.

Example I

A chewing gum composition containing one of the ion-exchange resins of the present invention is prepared from a chewing gum vehicle having the following composition:

|  | Percent |
|---|---|
| Gum base | 15–25 |
| Sucrose | 50–60 |
| Glucose | 15–25 |
| Softeners and fillers | 1–5 |

To the above chewing gum vehicle is thoroughly mixed while heated, 15% by weight of the anion-exchange resins "Duolite A–41" in a finely divided form and the gum containing the resin formed into chewing gum sticks of the conventional size and form.

Example II

Another chewing gum formulation useful in accordance with the present invention and from which the sweetening agent can be omitted altogether, if desired, and to which the ion-exchange resins are added as in Example I, has the following composition:

|  | Percent |
|---|---|
| Polybutene (Vistanex of molecular weight 80,000) | 5 |
| Low melting waxes | 50 |
| Low melting resins | 20 |
| Softeners | 5 |
| Calcium carbonate | 5 |
| Synthetic sweeting agent | 5 |
| Amberlite IRA–400 | 5 |
| Amberlite IRC–50 | 5 |

The chewing gum base disclosed in the examples of U.S. Patent No. 2,635,964 can also be used as in the present invention.

With the higher percentages of ion-exchange resin in the gum compositions there is a tendency for small amounts of the resin to separate from the gum vehicle and therefore, for ordinary use, concentrations of resins above about 25% are not particularly desirable, and substantially smaller concentrations are entirely satisfactory.

The specific embodiments of the invention have been concerned with only a few ion-exchange resins which are already available in pharmaceutical grades. It should be understood, however, that with careful handling any of the ion-exchange resins disclosed herein can be produced in a pharmaceutically acceptable form devoid of objectionable impurities. The present invention, therefore, is not limited to the particular resins disclosed but includes within the broad scope thereof the innocuous ion-exchange resins or combinations thereof.

While the manner in which the compositions of the present invention prevent high concentration of odoriferous matter is not precisely known, it appears that in addition to adsorbing the odoriferous endogenous products which are produced, the compositions of the present invention also remove from the medium essential reactants of the endogenous system which produce the harmful and objectionable products. Thus, for example, by providing a composition suitable for prolonged and intimate contact with the oral cavity surfaces, it is possible to remove bacteria or enzymes which are necessary for the production of the odoriferous decomposition products. Consequently, by interfering with the normal equilibrium, smaller amounts of the objectionable endogenous products will be formed. Thus, in addition to adsorbing objectionable reaction products, the compositions of the present invention appear to also exert an inhibitory effect on the production of endogenous products.

This is a continuation-in-part application of my co-pending application Serial No. 358,940, filed June 1, 1953, now abandoned.

Others may readily adapt the invention for use under various conditions of service, by employing one or more of the novel features disclosed or equivalents thereof. As at present advised with respect to the apparent scope of my invention, I desire to claim the following subject matter.

I claim:

1. A palatable non-irritating composition for use in the oral cavity for combating odor-producing products comprising; about 5 to 40 percent by weight of a basic anion-exchange resin condensation product of a phenyl containing group, an aldehyde, and an alkylene polyamine uniformly dispersed in a chewing gum base which comprises between about 60 and 95 percent by weight of said composition, and said composition being stable and providing a mildly basic pH of at least pH 7; whereby said composition is capable of combating odor producing endogenous products of the oral cavity when brought into intimate contact therewith.

2. A palatable non-irritating composition for use in the oral cavity for combating odor-producing products comprising; a basic anion-exchange resin condensation product uniformly dispersed in a non-toxic, non-irritating carrier which comprises between about 60 to 95 percent by weight of said composition, said carrier being a chewing gum base, said resin comprising about 5 to 40 percent by weight of said composition, and said composition providing a mildly basic pH of at least pH 7.

3. A composition as in claim 2 wherein the said resin is a condensation of dihydroxyphenyl dimethylamine, formaldehyde, and a polyethylene polyamine.

4. A composition as in claim 2 wherein the said resin is a chloromethylated copolymer of polystyrene and divinyl benzene which is condensed with an amine.

5. A palatable non-irritating composition for use in the oral cavity for combating odor producing products comprising; a mixture of a basic anion exchange resin condensation product and a mildly acidic cation exchange resin condensation product uniformly dispersed in a chewing gum base comprising between about 60 and 95 percent by weight of said composition, said resin mixture comprising between about 5 to 40 percent by weight of said composition, and said composition providing a mildly basic pH of at least pH 7.

6. A composition as in claim 5 wherein said cation exchange resin is a carboxylic cation exchange resin.

7. A composition as in claim 6 wherein said cation exchange resin is a copolymer of methacrylic acid and divinyl benzene.

8. A composition as in claim 6 wherein the said anion exchange resin is a condensation product of chloromethylated copolymer of polystyrene and divinyl benzene condensed with triethylamine.

References Cited in the file of this patent

UNITED STATES PATENTS

| 2,501,927 | Block | Mar. 28, 1950 |
| 2,550,489 | Martin | Apr. 24, 1951 |
| 2,581,035 | Martin | Jan. 1, 1952 |

(Other references on following page)

UNITED STATES PATENTS

| | | |
|---|---|---|
| 2,591,573 | McBurney | Apr. 1, 1952 |
| 2,653,902 | Thurmon | Sept. 29, 1953 |
| 2,673,827 | Kohlstaedt | Mar. 30, 1954 |
| 2,684,321 | Thurmon | July 20, 1954 |
| 2,798,053 | Brown | July 2, 1957 |

FOREIGN PATENTS

| | | |
|---|---|---|
| 294,299 | Great Britain | July 26, 1928 |
| 332,142 | Great Britain | July 17, 1930 |
| 666,987 | Germany | Nov. 2, 1938 |
| 695,558 | Germany | Aug. 28, 1940 |

OTHER REFERENCES

Thurmon: J. Investigative Dermatology, vol. 18, 1952, pages 333–339. (Copy in Scientific Library.)

Amer. J. of Digest Diseases 17 (5): 151–154, 1950.

Arnold: New England J. of Medicine 245: 9, Aug. 30, 1951, pp. 331–336.

McChesney: J. Am. Pharm. Asso. 40: 4 Sci. Ed., April 1951, pp. 193–196.

J. Amer. Pharm. Asso.: Practical Pharm. Ed., May 1949, p. 264.

McChesney: J. Lab. and Clin. Med., 39: 4, April 1952, pp. 629, 636.

Ikai: J. Invst. Derm., 23: 6, December 1954, pp. 411–422, Rohm and Haas Co., Phila. Lab. Manual, Amberlite IRA-400, pp. 4–6, September 1949.